United States Patent
Arya et al.

(10) Patent No.: US 8,885,491 B1
(45) Date of Patent: Nov. 11, 2014

(54) METHOD AND SYSTEM FOR COMMUNICATING CONDITIONAL ACCESS PACKET SIGNALS THROUGH A NETWORK

(75) Inventors: Vishal Arya, Manhattan Beach, CA (US); Kambiz Agahian, Marina Del Rey, CA (US); Sunil A. Jethwani, Encino, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 183 days.

(21) Appl. No.: 13/270,115

(22) Filed: Oct. 10, 2011

(51) Int. Cl.
*H04W 4/00* (2009.01)

(52) U.S. Cl.
USPC .......................................................... 370/250

(58) Field of Classification Search
None
See application file for complete search history.

(56) References Cited

U.S. PATENT DOCUMENTS

| | | | | |
|---|---|---|---|---|
| 2005/0249213 | A1* | 11/2005 | Higuchi et al. | 370/390 |
| 2006/0198394 | A1* | 9/2006 | Gotoh et al. | 370/469 |
| 2008/0259924 | A1* | 10/2008 | Gooch et al. | 370/392 |
| 2010/0205647 | A1* | 8/2010 | Yu et al. | 725/152 |

* cited by examiner

*Primary Examiner* — John Blanton

(57) ABSTRACT

A method and system for communicating a conditional access signal through a network includes a source segment generating a first conditional access packet signal comprising a first header having a first destination identifier with a first format. The system also includes a first routing server associated with the source segment generating a second header with a second destination identifier having a second format different than the first format and replacing the first header with the second header. The system also includes a second routing server in communication with the first routing server through the network. The second routing server replaces the second header with a third header having a third destination identifier having the first format to form a third conditional access packet signal. A plurality of receiving devices receive the third conditional access packet signal.

22 Claims, 5 Drawing Sheets

METHOD AND SYSTEM FOR COMMUNICATING CONDITIONAL ACCESS PACKET SIGNALS THROUGH A NETWORK

TECHNICAL FIELD

The present disclosure relates generally to communication systems, and more particularly to a method and system for communication conditional packet signals through a network.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers. Providing reliable signals reduces the overall cost of the system by reducing the number of received calls at a customer call center.

In satellite broadcasting systems, users have come to expect the inclusion of local channels in addition to the channels broadcast for the entire Continental United States. Collecting the channels may be performed in various manners, including providing a manned station that receives the signals. The signals may be uplinked from various locations which are described as a remote uplink facility. Providing manned stations increases the labor costs and thus increases the overall cost of the service.

To provide reliable signals, development and monitoring of broadcasted satellite signals is performed. The monitoring of signals may take place at various locations including remote uplink facilities or local collection facilities. Development of receiving devices might take place at various engineering locations and thus the receiving devices may also be controlled. Controlling receiving devices may be performed using a control access packet stream. Conditional access packets are used in many paid video services. Conditional access and data is sent to or from a video service provider to the various receiving to enforce access control in an authorized delivery of content. The conditional access packets are broadcasted to all of the receiving devices and are received by only the targeted receiving devices. Conditional access packets are typically generated in a one-to-many format which may also be referred to as a broadcast format. For development and monitoring purposes it may not be desirable to over-the-air broadcast development packet signals. However, the broadcast format of a conditional access packet signal does not allow a convenient method for communication, development and monitoring using receiving devices.

SUMMARY

The present disclosure provides a system and method for communicating conditional access packets through a terrestrial communication network.

In one aspect of the invention, a method of communicating a conditional access packet signal comprises generating a first conditional access packet signal comprising a first header having a first destination identifier with a first format at a source segment and generating a second header in a first routing server associated with the source segment. The second header has a second destination identifier with a second format different than the first format. The method also includes replacing the first header of the first conditional access packet with the second header to form a second conditional access packet signal, communicating the second conditional access packet signal with the second header from the first routing server through a network to a second routing server associated with a destination segment, generating a third header in the second routing server having a third destination identifier having the first format, replacing the second header with the third header to form a third conditional access packet signal and communicating the third conditional access packet signal to plurality of receiving devices.

In a further aspect of the invention, a system for communicating a conditional access signal through a network includes a source segment generating a first conditional access packet signal comprising a first header having a first destination identifier with a first format. The system also includes a first routing server associated with the source segment generating a second header with a second destination identifier having a second format different than the first format and replacing the first header with the second header. The system also includes a second routing server in communication with the first routing server through the network. The second routing server replaces the second header with a third header having a third destination identifier having the first format to form a third conditional access packet signal. A plurality of receiving devices is also included in the system and is in communication with the second routing server receiving the third conditional access packet signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
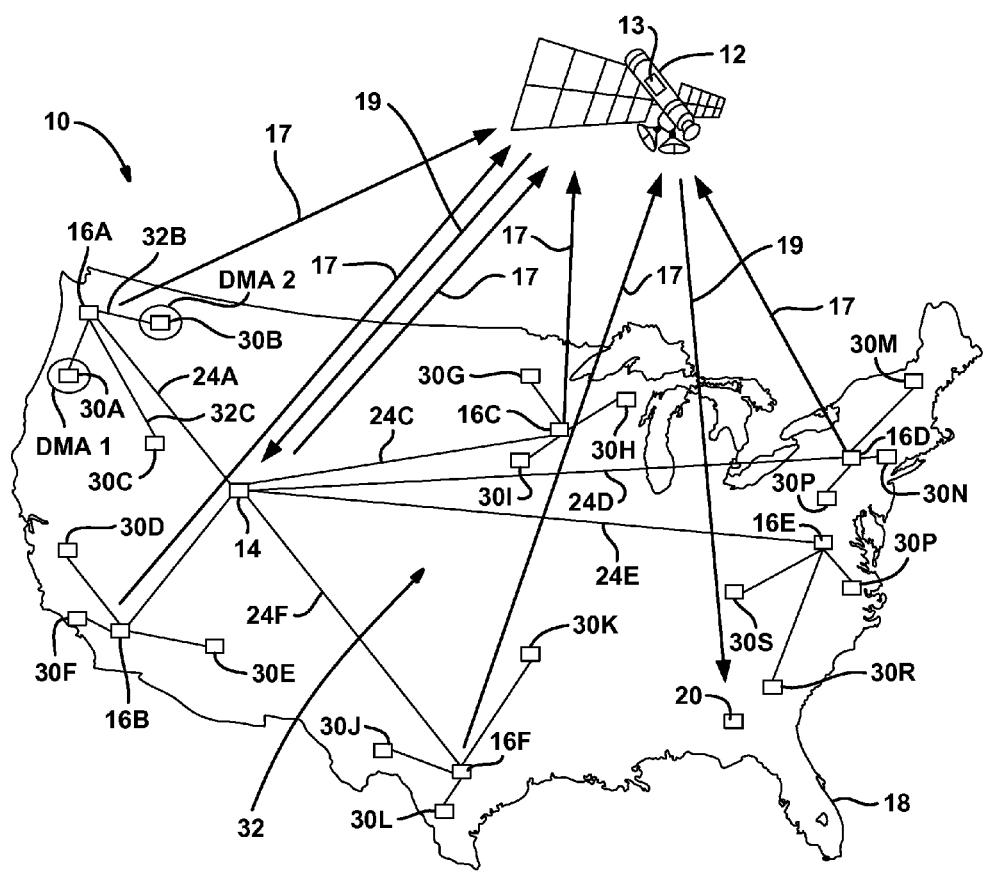
FIG. 1 is an overall system view of a collection and communication system in the continental United States.

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is described with respect to a satellite television system. However, the present disclosure may have various uses including satellite data transmission and reception for home or business uses. The system may also be used in a cable system or wireless terrestrial communication system.

Referring now to FIG. 1, a collection and communication system 10 includes a satellite 12 that includes at least one transponder 13. Typically, multiple transponders are in a satellite. Although only one satellite is shown, more than one is possible or even likely.

The collection and communication system 10 includes a central facility or Network operations center (NOC) 14 and a plurality of regional or remote uplink facilities (RUF) 16A, 16B, 16C, 16D, 16E and 16F. In a non-satellite system the facilities may be referred to as a remote facility. The regional or remote uplink facilities 16A-16F may be located at various locations throughout a landmass 18 such as the continental United States, including more or less than those illustrated. The regional or remote uplink facilities 16A-16F uplink various uplink signals 17 to satellite 12. The satellites downlink signals 19 to various users 20 that may be located in different areas of the landmass 18. The users 20 may be mobile or fixed users. The uplink signals 17 may be digital signals such as digital television signals or digital data signals. The digital television signals may be high definition television signals, standard definition signals or combinations of both. Uplinking may be performed at various frequencies including Ka band. The present disclosure, however, is not limited to Ka band. However, Ka band is a suitable frequency example used throughout this disclosure. The central facility or NOC 14 may also receive downlink signals 19 corresponding to the uplink signals 17 from the various regional or remote uplink facilities and from itself for monitoring purposes. The central facility 14 remote uplink facilities 16 ad local collection facilities 30 may monitor the quality of all the signals broadcast from the system 10. Signals from the remote uplink facilities 16 ad local collection facilities may be communicated back to the central facility 14 for controlling the transmission of the signals based upon the monitored signals. In this manner, the adjustments to various components may be made.

The central facility 14 may also be coupled to the regional or remote uplink facilities through a network 32 such as an internet protocol computer network having associated communication lines 24A-24F. Each communication line 24A-F is associated with a respective regional or remote uplink site 16. Communication lines 24A-24F are terrestrial-based lines. Each of the regional or remote uplink and central facilities includes a transmitting and receiving antenna which is not shown for simplicity in FIG. 1.

Each of the regional or remote uplink facilities 16A-16F may also be in communication with a local collection facility collectively referred to with reference numeral 30. As illustrated in FIG. 1, three local collection facilities are associated with each remote uplink facility 16. For example, remote uplink facility 16A has local collection facilities 30A, 30B and 30C associated therewith. Local collection facilities 30D-30S are associated with one of the other remote uplink facilities 16B-16F. Although only three local collection facilities are illustrated for each remote uplink facility 16, numerous local collection facilities may be associated with each remote uplink facility 16. The number of local collection facilities 30 may be numerous, such as 40 for each remote uplink facility. The number of local collection facilities 30 is limited by the amount of equipment and the capabilities thereof associated with each remote uplink facility 16.

The local collection facilities 30 are used for collecting local television stations in various designated marketing areas (DMAs). As is illustrated, local collection facility 30A is located in DMA1 and local collection facility 30B is located in DMA2. For simplicity, only two DMAs are illustrated. However, each local collection facility may be located in a DMA.

The local collection facilities 30 may also be in communication with each remote uplink facility 16 through the communication network 32. As will be described below, the communication network 32 may be an Internet protocol (IP) network. The signals from the local collection facilities 30 may thus be video-over-IP signals. Each of the remote uplink facilities 16 are in communication with each local collection facility 30 through the communication network 32. As is illustrated, local collection facility 30A is in communication with the remote uplink facility 16A through communication network 32A, while local collection facility 30B is in communication with the remote uplink facility 16A through communication network 32B, and so on.

Figure 2:
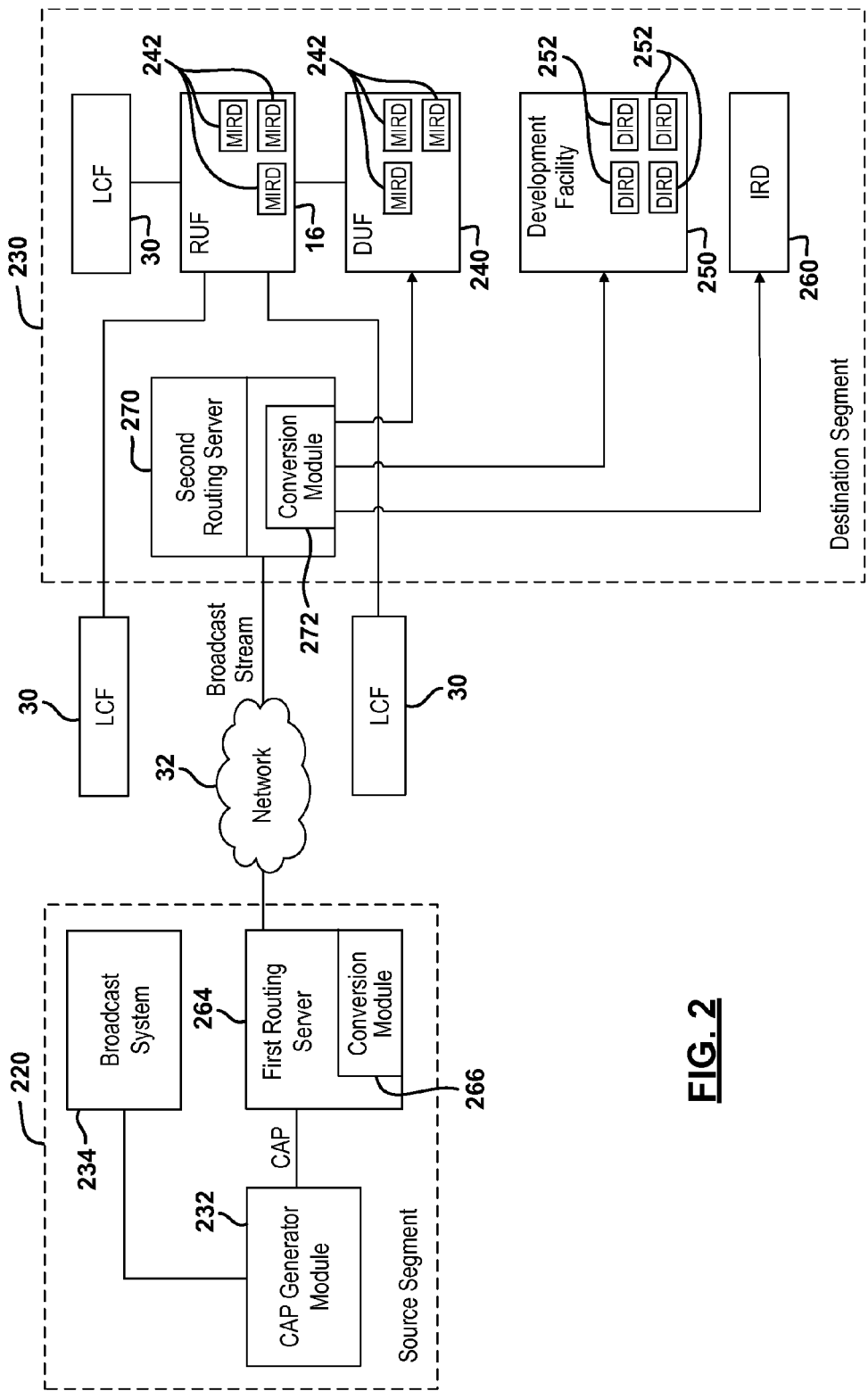
FIG. 2 is a high level block diagrammatic view of the conditional access packet distribution system according to the present disclosure.

Referring now to FIG. 2, a detailed block diagrammatic view of a system to 10 for delivering conditional access packets is set forth. In this example a source segment 220 is used for generating a conditional access packet signal. The conditional access packet signal is communicated to a destination segment 230 through the network 32. The source segment 220 includes a conditional access packet signal (CAP) generator module 232. The conditional access packet generator module 232 generates a conditional access packet signal. The conditional access packet signal may also be known as a control word packet. The conditional access packet signal comprises control access information that includes a control word and other control data used in support of providing conditional access to the program material that is encrypted and transmitted. Typically the conditional access packet signal is communicated through the broadcast system 234. In the present example, a satellite system is set forth. That is, the broadcast system 234 may represent the components for communicating the conditional access packet signal to the satellite 12 and illustrated in FIG. 1. The broadcast system 234 communicates the conditional access packet signal to a plurality of user receiving devices that may also be referred to as an integrated receiver decoder (IRD). The user receiving devices may be mobile devices or stationary devices such as a set top box.

The conditional access packet signal includes a payload as well as a header that includes various data that may include a source identifier, a destination identifier, and a port. Variations of the conditional access packet signal will be described further below. In this example, a destination identifier is in a first format. The first format may be a broadcast format used for broadcasting. Only receiving devices interested in the conditional access packet signal receive the conditional access packet signal based upon the destination identifier.

The destination segment 230 may include various components such as a remote uplink facility 16 and the local collection facilities 30 illustrated above. Each of these components is collectively referred to as a remote uplink facility 16 and the local collection facility 30. Although numerous local collection facilities and remote uplink facilities may be present in a system. A diverse uplink facility 240 may also be provided that acts as a back-up to the remote uplink facility 16. The diverse uplink facility 240 is used when the remote uplink facility 16 is not functioning properly or during times of maintenance. The diverse uplink facility 240 may nearly be identical to the remote uplink facility except that it may be located in a geographically diverse location such as a predetermined number of miles away such as 100 miles. In this manner weather may be less likely to affect both the remote uplink facility 16 and the diverse uplink facility 240 in a similar manner.

The remote uplink facility and the diverse uplink facility may include a plurality of monitoring receiving devices 242. The monitoring receiving devices 242 may also be associated with a display for displaying content received therethrough. The monitoring receiving devices 242 may be configured in a similar manner to a set top box normally used in satellite broadcasting. The monitoring receiving devices 242 may communicate with the source segment 220 to report errors thereto. The diverse uplink facility 240 may also include monitoring receiving devices 242. A development facility 250 may also have receiving devices associated therewith. In this example development receiving devices 252 are provided within the development facility 250. The output of the development receiving devices 252 may be used locally or may be communicated to another location such as the source segment or head end for monitoring.

The system 210 may also be used outside of development and monitoring purposes. For example, a receiving device 260 may be in communication with the source segment 220 through the network 32. A first routing server 264 receives the conditional access packet signals from the conditional access packet signal generator module 232. As mentioned above, the conditional access packet generator module 232 generates a broadcast stream with a broadcast destination identifier. The first routing server 264 includes a conversion module 266 that is used for monitoring the conditional access packet signal generated by the conditional access packet generator module 232. The monitoring of the conditional access packet signal at the conversion module may also be performed when looking at other identifying data of the conditional access packet signal. For example, both the source and the destination internet protocol address may be monitored. As well, the source and destination port numbers of the conditional access packet signal may also be monitored. Signals or conditional access packet signals that correspond to the monitored data are not immediately sent to the network 32. Instead, the conversion module 266 converts the conditional access packet signal to a second conditional access packet signal. As will be described below, the identifier may be changed. The change may take place within the headers in which the destination identifiers are found. The conditional access packet generator module 232 generates a destination identifier that is a broadcast identifier. The conversion module 266 changes the format of the broadcast destination identifier to a second format such as a point-to-multi-point destination identifier.

The destination segment 230 may also have at least one second routing server 270 associated therewith. The second routing server 270 also includes a conversion module 272 for converting the header of the conditional access packet signal to a third header. That is, the point-to-multi-point destination identifier may be changed to a third format such as a broadcast destination identifier in the conversion module 272. The broadcast destination is the same format as the original signal of the source.

The second routing server 270 may communicate the converted conditional access packet signal to the remote uplink facility 16, the diverse uplink facility, or to the development facility 250. The second routing server 270 may also be in communication with the receiving device 260.

The conversion module 272 of the second routing server 270 replaces the point-to-multi-point format of the destination identifier with a broadcast formatted destination identifier within the conditional access packet signal.

Figure 3A:
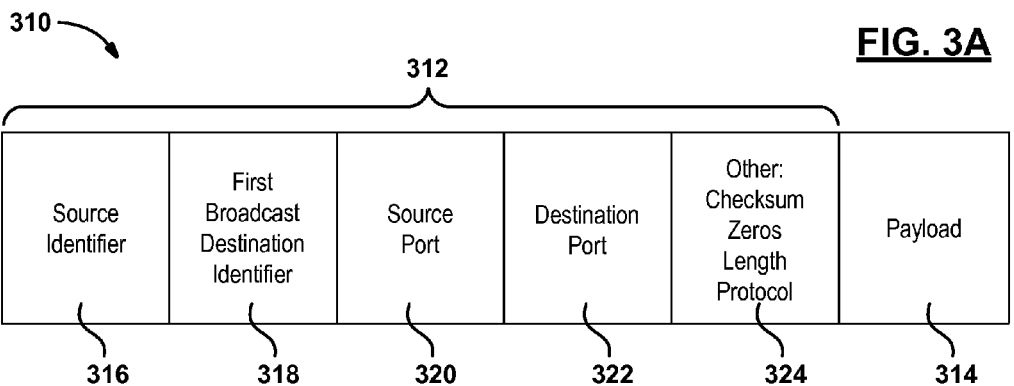
FIG. 3A is a representation of an unmodified conditional access packet signal.

Referring now to FIG. 3A, a first conditional access packet signal 310 is illustrated. The conditional access packet signal 310 includes a header 312 and a payload 314. The header 312 includes a source identifier 316 that identifies the source module. The destination identifier 318 includes a first broadcast destination identifier. As mentioned above, the broadcast format of the destination identifier does not allow transmission through an internet protocol network. The header 312 may also include a source port 320 and a destination port 322. The header 312 may also include other types of data or identifiers including but not limited to check sums, zeros, a length, or a protocol.

Figure 3B:
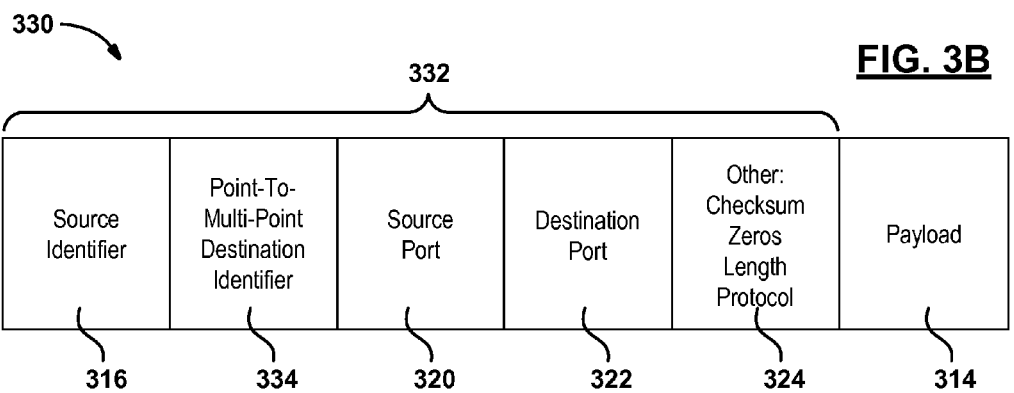
FIG. 3B is a representation of a first modified conditional access packet signal with a point-to-multi-point destination identifier for communication through a network.

Referring now to FIG. 3B, a second conditional access packet signal 330 is set forth. The conditional access packet signal 330 has been converted by the conversion module 266 of the first routing server 264 at the source segment of FIG. 2. The unchanged portions of the header are labeled the same as in FIG. 3A. In the header 332, the destination identifier 334 has been changed to a second format. That is, the destination identifier 334 is changed to a point-to-multi-point destination identifier. The source identifier 316, the source port 320, the destination port 322 and the payload 314 are unchanged.

Figure 3C:
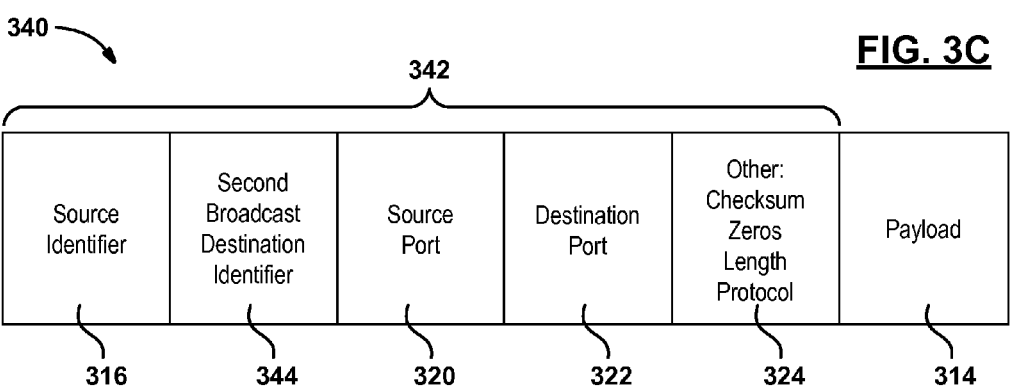
FIG. 3C is a representation of a conditional access packet signal formed after receiving at a destination.

Referring now to FIG. 3C, a third conditional access packet signal 340 is set forth. In this example, the header 342 has been changed compared to the second header 332 of FIG. 3B by changing the destination identifier 344 from a point-to-multi-point destination identifier to a broadcast destination identifier 344. This is the same format as FIG. 3A. The conversion module 272 of the second routing server 270 performs the change. The other portions of the signal 340 have not been changed in this example.

Figure 4:
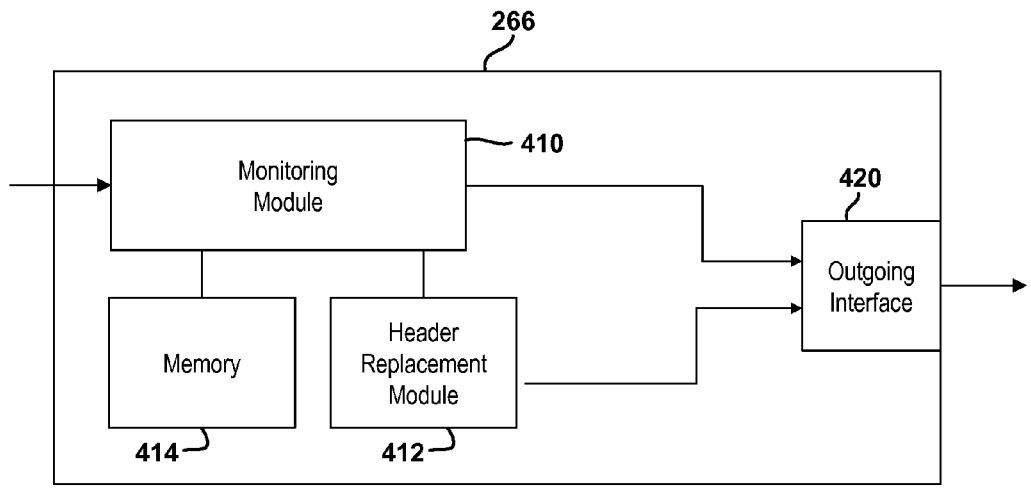
FIG. 4 is a block diagrammatic view of a conversion module in a source routing server.

Referring now to FIG. 4, the conversion module 266 is illustrated in further detail. The conversion module 266 includes a monitoring module 410 that is used to monitor the conditional access packet signal at the source segment. The monitoring module 410 may monitor one or more data portions in the header of the conditional access packet signal. For example, the destination identifier may be monitored. Further, the source identifier may also be monitored. Likewise, the port number within the header of the conditional access packet signal may also be monitored. When the monitoring module 410 detects that the one or more monitored data within the header corresponds to an "of interest" conditional access packet signal, a header replacement module 412 may be used to generate a replacement header or header portion of the conditional access packet signal. The header replacement module 412 may replace a broadcast destination address with a point-to-multi-point destination identifier. Alternatively, the destination identifier may also be temporarily stored in a memory 414 prior to replacement.

It should be noted that the header replacement module 412 may maintain the source identifier and the source and destination port identifiers and only replace the destination identifier.

An outgoing interface module 420 receives a signal from the monitoring module 410 and a signal from the header replacement module 412. The output of the outgoing interface 420 is an unchanged signal from the monitoring module 410. When a conditional access packet signal is identified, the header replacement module 412 communicates a modified conditional access packet signal to the outgoing interface 420.

Figure 5:
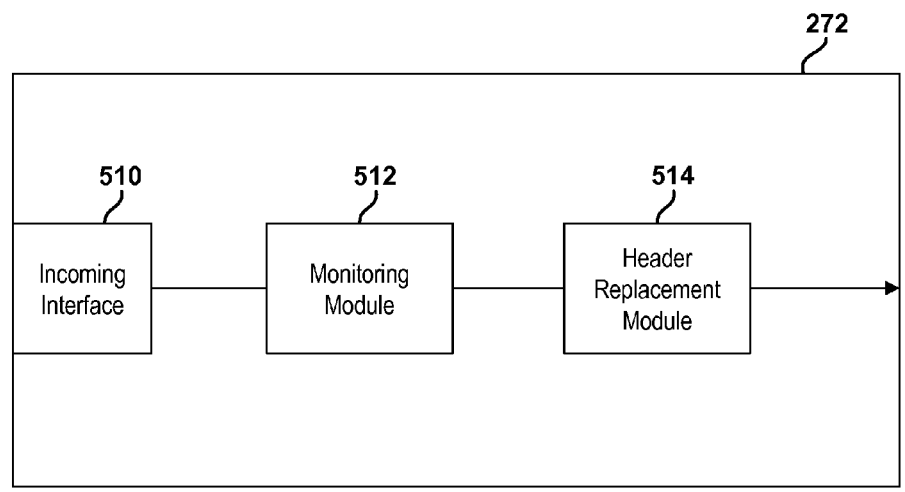
FIG. 5 is a high level block diagrammatic view of a conversion module in a destination routing server.

Referring now to FIG. 5, the conversion module 272 of FIG. 2 is set forth. The conversion module 272 includes an incoming interface 510 that monitors the signals from the network. A monitoring module 512 allows the conversion module 272 to receive the signals. The header replacement module 514 receives the signals of interest and replaces the point-to-multi-point destination with a broadcast destination identifier.

The conversion module 272 or the second routing server 270 may have a number of incoming interfaces 510. The incoming interfaces 510 have an address associated therewith. The second routing server knows which of its interfaces is connected to receive the conditional access packet signals. The address may be used to generate the point-to-multi-point destination identifier.

Figure 6:
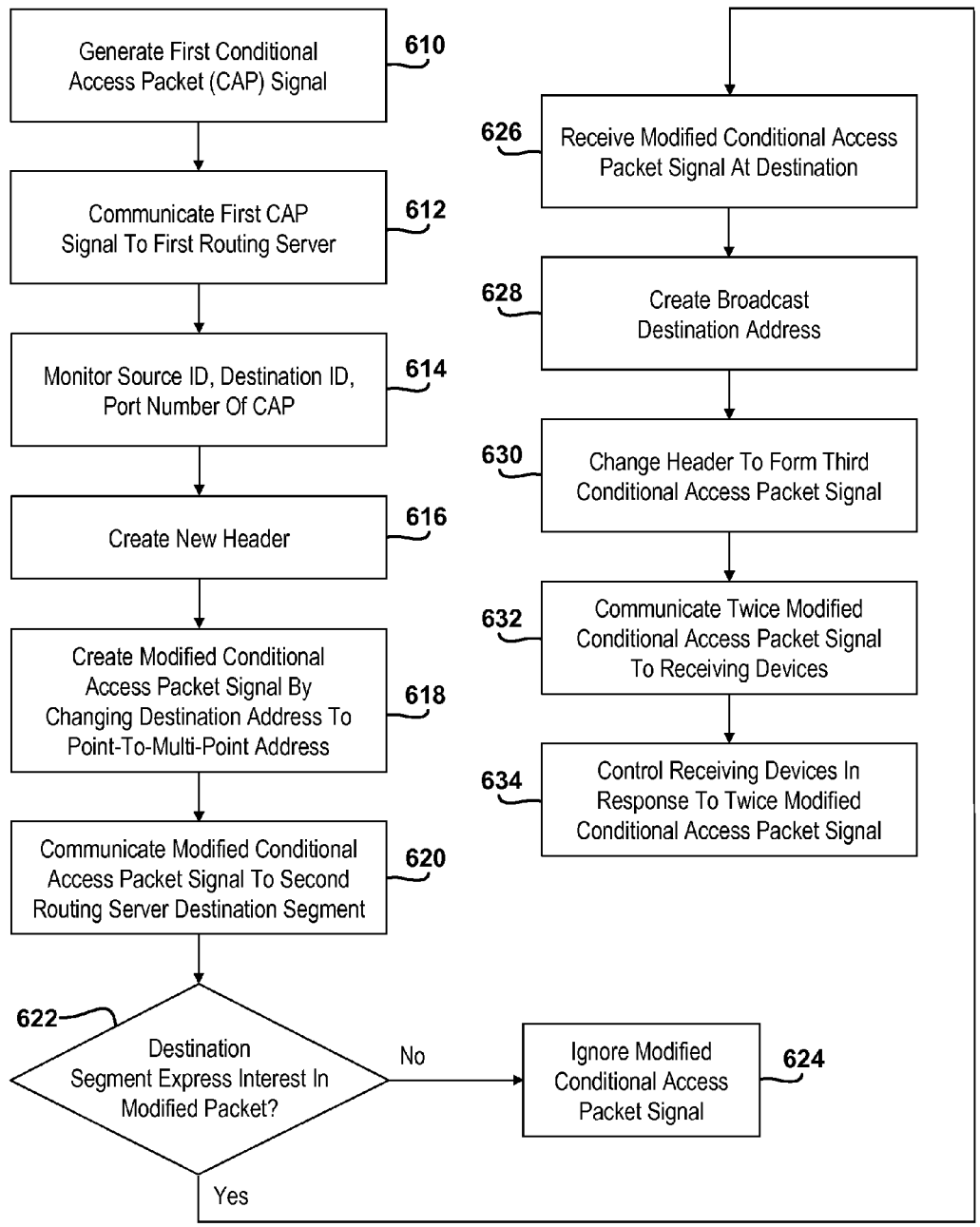
FIG. 6 is a flow chart of a method for operating the conditional access packet signal distribution system.

Referring now to FIG. 6, a method for communicating a conditional access packet signal is set forth. In step 610, a first conditional access packet signal is generated at the source segment. The first conditional access signal has a broadcast destination identifier as described above. The broadcast destination identifier is provided within the header of the conditional access packet signal. Other types of data may also be included within the header including a source identifier, a source port and a destination port.

In step 612, the first conditional access packet signal is communicated to the sending routing server. In step 614, the routing server monitors the header of the first conditional access packet signal. One or more of the header data may be monitored including the destination identifier, the source identifier, the destination port identifier and the source port identifier of the first conditional access packet.

In step 616, a second header is created. In step 618, a modified or second conditional access packet signal is created. The second conditional access packet signal is created by replacing the first destination address of the first header of the first conditional access signal from a broadcast identifier with a point-to-multi-point address. This may be performed while maintaining or not changing the source address or the source or destination port identifier. It should be noted that during step 618 the destination identifier of the first conditional access packet signal may be stored in a memory during the replacement process.

In step 620, the second conditional access packet signal is communicated to the destination segment. In step 622, the destination segment may express an interest in the modified packet. When the destination segment does not express an interest in the modified packet, step 624 is performed which ignores the second conditional access packet signal. In step 622, if the destination segment does express an interest in the modified packet, step 626 is performed. The destination segment expresses interest in the packet when the point-to-multi-point destination address corresponds to a desired address of the destination. In step 626, the second conditional access packet signal is received into the second routing server which is within the destination. In step 628, a second broadcast destination address is created within the second routing server to again modify the conditional access packet signal to form a third conditional access signal. By changing the destination address, the header is changed in step 630 to form a third conditional access packet signal. Again, the source identifier, source port and destination port may be maintained. The routing server of the destination is configured to know which of its interfaces are connected to the receivers of the traffic. It is able to use the broadcast address of the interface connected to the receiver's segment which is known to all routing servers to create the destination address of the new packet. The source address does not change and still points to the actual source of the traffic.

In step 632, the third conditional access packet signal is communicated to various receiving devices. In step 634, the receiving devices are controlled in response to the twice modified conditional access packet signal. The receiving devices may be a set top box or other type of integrated receiver decoder. As mentioned above, the receiving device may be used for monitoring at various locations such as a remote uplink facility or other facility. Further, the conditional access packet signals may be uplinked to a satellite and communicated to various receiving devices in this manner.

While particular embodiments of the disclosure have been shown and described, numerous variations and alternate embodiments will occur to those skilled in the art. Accordingly, it is intended that the disclosure be limited only in terms of the appended claims.

What is claimed is:

1. A method comprising:
   generating a first conditional access packet signal comprising a first header having a first destination identifier with a first broadcast format at a source segment;
   generating a second header in a first routing server associated with the source segment, said second header with a second destination identifier having a point-to-multi-point format different than the first broadcast format;
   replacing the first header of the first conditional access packet with the second header to form a second conditional access packet signal;
   communicating the second conditional access packet signal with the second header from the first routing server through a network to a second routing server associated with a destination segment;
   generating a third header in the second routing server having a third destination identifier having the first broadcast format;
   replacing the second header with the third header to form a third conditional access packet signal; and
   communicating the third conditional access packet signal to a plurality of receiving devices.

2. The method as recited in claim 1 wherein generating the first conditional access packet signal comprises generating the first conditional access packet signal comprising the first header having the first destination identifier, a first source identifier and a first port identifier.

3. The method as recited in claim 1 further comprising monitoring each of the source identifier, destination identifier and port identifier in a first routing server and wherein generating the second header comprises generating the second header in response to monitoring.

4. The method as recited in claim 1 further comprising controlling the plurality of receiving devices in response to the third conditional access packet signal.

5. The method as recited in claim 1 wherein communicating the third conditional access packet signal comprises communicating the third conditional access packet signal to the plurality of receiving devices disposed within a development facility.

6. The method as recited in claim 1 wherein communicating the third conditional access packet signal comprises communicating the third conditional access packet signal to the plurality of receiving devices disposed within a remote uplink facility.

7. A method comprising:
generating a first conditional access packet signal comprising a first header having a first source identifier, a first broadcast destination identifier, and a port identifier;
monitoring the first source identifier, the first broadcast destination identifier and the port identifier in a first routing server;
generating, in the first routing server, a point-to-multi-point destination identifier in response to monitoring;
replacing the first header with the second header in the first routing server to form a second conditional access packet signal and maintaining the source identifier;
communicating the second conditional access packet signal through a network to a second routing server associated with a destination segment;
generating the first broadcast destination identifier;
replacing the point-to-multi-point destination identifier with the first destination identifier to form a third conditional access packet signal; and
communicating the third conditional access packet signal to a plurality of receiving devices.

8. The method as recited in claim 7 further comprising controlling the plurality of receiving devices in response to the third conditional access packet signal.

9. The method as recited in claim 8 wherein controlling the plurality of receiving devices comprises receiving satellite signals.

10. A method as recited in claim 7 wherein the first conditional access packet signal comprises a first payload and wherein the second conditional access packet signal comprises the first payload.

11. A method as recited in claim 7 wherein generating a second header comprises storing the first broadcast destination identifier in a memory of the first routing server.

12. A method as recited in claim 7 wherein communicating the second conditional access packet signal with the second header to the second routing server comprises communicating the second conditional access packet signal with the second header comprising the first source identifier.

13. A method as recited in claim 7 wherein communicating the second conditional access packet signal with the second header to the second routing server comprises communicating the second conditional access packet signal with the second header comprising the first source identifier and the port identifier.

14. A method as recited in claim 7 wherein generating the third header comprises generating the third header comprising comprises the first source identifier.

15. A method as recited in claim 7 wherein generating the third header comprises generating the third header comprising the first source identifier and the port identifier.

16. A system comprising:
a source segment generating a first conditional access packet signal comprising a first header having a first destination identifier with a first broadcast format;
a first routing server associated with the source segment generating a second header with a second destination identifier having a point-to-multipoint format different than the first broadcast format and replacing the first header with the second header;
a second routing server in communication with the first routing server through a network, said second routing server replacing the second header with a third header having a third destination identifier having the first broadcast format to form a third conditional access packet signal; and
a plurality of receiving devices in communication with the second routing server receiving the third conditional access packet signal.

17. The system as recited in claim 16 wherein the first header comprises the first destination identifier, a first source identifier and a first port identifier.

18. The system as recited in claim 17 wherein the first routing server monitors each of the first source identifier, first destination identifier and first port identifier in a first routing server and wherein the first routing server generates the second header in response to monitoring.

19. The system as recited in claim 16 wherein the first format comprises a broadcast destination identifier.

20. The system as recited in claim 16 wherein the plurality of receiving devices are controlled in response to the third conditional access packet signal.

21. The system as recited in claim 16 wherein the plurality of receiving devices are disposed within a development facility.

22. The system as recited in claim 16 wherein the plurality of receiving devices are disposed within a remote uplink facility.

* * * * *